(12) United States Patent
Love

(10) Patent No.: US 6,757,424 B2
(45) Date of Patent: Jun. 29, 2004

(54) METHOD FOR CONDUCTING ANALYSIS OF TWO-DIMENSIONAL IMAGES

(75) Inventor: Patrick B. Love, Bellingham, WA (US)

(73) Assignee: LumenIQ, Inc., Bellingham, WA (US)

(*) Notice: Subject to any disclaimer, the term of this patent is extended or adjusted under 35 U.S.C. 154(b) by 626 days.

(21) Appl. No.: 09/734,241

(22) Filed: Dec. 8, 2000

(65) Prior Publication Data

US 2002/0114508 A1 Aug. 22, 2002

Related U.S. Application Data

(63) Continuation-in-part of application No. 09/344,897, filed on Jun. 22, 1999, now Pat. No. 6,445,820.
(60) Provisional application No. 60/091,089, filed on Jun. 29, 1998.

(51) Int. Cl.[7] .................................................. G06K 9/00
(52) U.S. Cl. ........................ 382/154; 382/186; 382/187
(58) Field of Search ................................. 382/119, 123, 382/154, 178, 186–187, 189, 199, 218; 345/419; 348/42, 51; 434/155

(56) References Cited

U.S. PATENT DOCUMENTS

| | | | |
|---|---|---|---|
| 4,024,500 A | 5/1977 | Herbst et al. ................ | 382/178 |
| 5,251,265 A | 10/1993 | Dohle et al. ................. | 382/123 |
| 5,347,589 A | 9/1994 | Meeks et al. ................ | 382/119 |
| 5,359,671 A | 10/1994 | Rao ............................ | 382/225 |
| 5,633,728 A | 5/1997 | Tachihara et al. ............ | 358/301 |
| 5,666,443 A | 9/1997 | Kumashiro .................. | 382/266 |
| 5,730,602 A | 3/1998 | Gierhart et al. ............. | 434/155 |
| 5,740,273 A | 4/1998 | Parthasarathy et al. ...... | 382/187 |
| 5,774,582 A | 6/1998 | Gat et al. .................... | 382/186 |

OTHER PUBLICATIONS

Richard A. Dusak; "The Forensic Information System for Handwriting (FISH)"; presentation material for American Academy of Forensic Sciences annual meeting Feb. 15–20, 1993; 17 pages.

Communication Intelligence Corporation; "Sign–it" (formerly "PenOp"); sales literature; Copyright dates 2000, 2001; 6 pages.

Pikaso Software Inc.; "Write–On—Handwriting Comparison Software"; sales literature; undated; 2 pages.

Sheila Lowe & Associates; "The Write Choice—Handwriting Analysis Software for Windows"; web site literature printed Oct. 28, 2001 and Oct. 25, 2001; 23 pages.

(List continued on next page.)

*Primary Examiner*—Daniel Mariam
(74) *Attorney, Agent, or Firm*—Graybeal Jackson Haley LLP

(57) ABSTRACT

A method for analysis of a two-dimensional image. The two-dimensional image is scanned to form a digital bit-map of X-Y axis locations in the image. Gray-scale densities are measured at each of the locations, and are used to calculate third, Z-axis values. The X-Y-Z axis coordinates are plotted so as to form a virtual three-dimensional image having a contour that corresponds to variations in the gray-scale density in the two-dimensional source image. The virtual three-dimensional image provides for enhanced visualization, measurement and analysis of features and characteristics contained within the source image. The gray-scale density may be black-and-white gray-density or RGB color-density or other digital color mapping protocols reduced or converted, for example, to 8-bit 256 gray or color scale. The two-dimensional source image may be a sample of handwriting. A method for enhanced two-dimensional analysis using the digitized bit-map of the source image is also provided.

22 Claims, 8 Drawing Sheets

OTHER PUBLICATIONS

Image Metrology Aps; "Scanning Probe Image Processor (SPIP) for Windows"; sales literature; Oct. 17, 2001; 4 pages.

National Instruments; "LabVIEW"; brochure and seminar information; copyright dates 1999 and 2000; 4 pages.

Sensor Products Inc.; "TOPAQ The Tactile Force Analysis System"; sales literature; copyright date 2000; 6 pages.

Image Content Technology LLC; "Lucis DHP Algorithm" Technical Overview; Copyright date 1999; 39 pages.

MediaCybernetics; "Image Pro PLUS The Proven Solution"; web site literature; printed Oct. 18. 2001; 8 pages.

Kitware: "Visualization Toolkit"; web site literature; printed Oct. 23, 2001, 2 pages.

FIG. 9

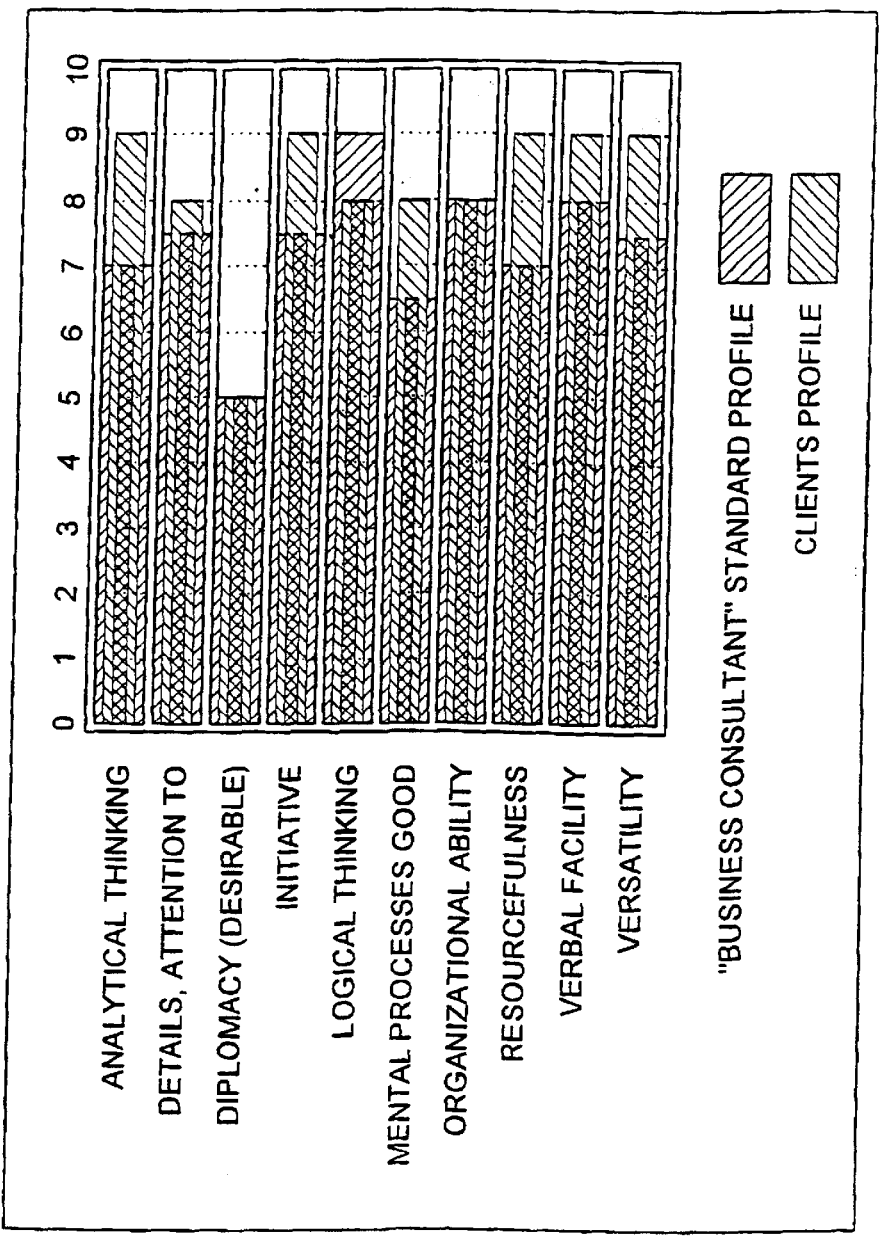

METHOD FOR CONDUCTING ANALYSIS OF TWO-DIMENSIONAL IMAGES

This Application is a continuation-in-part of U.S. application Ser. No. 09/344,897 filed on Jun. 22, 1999 (which is now U.S. Pat. No. 6,445,820 issued Sep. 3, 2002), which claims priority to and the benefit of the filing date of U.S. Provisional Application Serial No. 60/091,089 filed Jun. 29, 1998.

BACKGROUND OF THE INVENTION a. Field of the Invention

The present invention relates generally to methods for the analysis of two-dimensional images, and, more particularly, to a method for analyzing two-dimensional images by using gray-scale density variations of the image to calculate a third axis which is used to produce a virtual 3-dimensional image for quantitative and qualitative analysis.

b. Background Art

There are many instances in which it is desirable to analyze a two-dimensional image in order to ascertain certain characteristics or qualities relating to the image. For example, it is often necessary to analyze and compare handwriting samples in order to determine the authenticity of a signature or other writing. Similarly, fingerprints, ballistics patterns and DNA patterns ("smears") require analysis and comparison in order to match them to an individual or a weapon. Still further, outside the fields of criminology and forensics, many medical and industrial processes and tests require analysis of two-dimensional images, such as analysis of the fine details of image density depicted on medical x-rays and MRI's, for example.

These are just a few examples of the vast array of two-dimensional images that may require analysis and comparison. Therefore, although the following discussion focuses largely on analysis of handwriting for the purpose of illustrating a preferred embodiment of the present invention, it will be understood that the scope of the present invention includes analysis of all two-dimensional images that are susceptible to the methods described herein.

Conventional methods for analyzing two-dimensional images are generally labor-intensive, subjective, and highly dependent on the individual analyst's experience and attention to detail. Not only do these factors increase the cost of the process, but they also tend to introduce inaccuracies that reduce the value of the results. The analysis of handwriting particularly illustrates these problems. Sometimes referred to as graphoanalysis, or questioned document examination (QDE), handwriting analysis is most commonly conducted for purpose of determining the authenticity of a document or signature. In some instances, however, handwriting analysis may be conducted for other reasons, such as for comparing a person's writing against predetermined criteria to determine aspects of the writer's personality or emotional characteristics; for example, handwriting is often analyzed for the purpose for evaluating a person's emotional responsiveness and their suitability for employment in a position requiring particular skills or traits, or for assignment to work with certain groups of people or to perform certain tasks.

Analyzing handwriting for any of these purposes involves obtaining numerous, painstaking measurements from one or more samples of the writing. For example, to determine whether or not a particular person wrote a certain document, minute details of the writing must be measured, catalogued and compared to measurements taken from a sample of known authenticity, much in the manner of fingerprint analysis. Similarly, to determine a writer's emotional characteristics from a handwriting sample, a great many measurements of heights, angles and other features are taken from individual letters and words throughout the writing, and these measurements are then analyzed statistically and compared with certain predetermined standards, which themselves have been produced by compiling a vast number of measurements taken from handwriting produced by persons having known emotional characteristics.

Although the value of handwriting analysis is well recognized, its widespread use has been hampered by the fact that the necessary measurements have in the past been obtained almost invariably by manual means, using a magnifying glass, or protractor, pencil and other unsophisticated tools. Because of the sheer number of measurements involved, analyzing even a single person's handwriting has thus been a time-consuming and expensive process. Moreover, since manual measurement techniques involve drawing various lines and marks on the sample using a pencil or other writing instrument, these techniques necessarily deface/damage the original to some extent, which renders subsequent measurements even more difficult and decreases the usefulness of original document.

Perhaps an even more serious problem is the degree of inaccuracy which is inherent in such manual techniques. Human judgment and therefore human error are inevitably present in such techniques, and consequently accuracy is heavily dependent on the manual dexterity and skills of the individual analyst. Furthermore, since analyzing even a single handwriting sample can involve taking hundreds of measurements, fatigue often becomes a very real factor and can impair the efforts of even the most skilled practitioner. Still further, many aspects of the process are quite subjective in nature, such determining the baselines and other starting points, and so there can be a high degree of variability between measurements taken from the same sample by different analysts.

Moreover, even when performed by a skilled analyst using the greatest degree of care, there are certain determinations that are virtually impossible to make when using conventional techniques. For example, a recurring question is whether a signature was applied to a document before or after it was printed. This is done by trying to determine whether the writing passes on top of the printing, or vice versa. Previously, there has existed no reliable way for making this determination, and it is very common for different analysts to come to completely different conclusions when examining the same document.

As a result, the inefficiencies and inaccuracies that are inherent in conventional handwriting analysis have limited its widespread availability and use. For example, graphoanalysis is potentially an extremely valuable tool for human resources departments and governmental agencies, but the problems with cost and accuracy have limited its adoption in these areas. Similarly, the difficulty in obtaining economical and accurate analysis of handwriting specimens has rendered this resource unavailable to many criminal and civil investigators, especially for police departments and other agencies located more rural areas, where availability of skilled handwriting analysts tends to be limited and budgets tend to be tight.

As was stated above, handwriting analysis is just one example of the many areas where improved methods for analysis of two-dimensional images are needed. Many of the same factors and problems discussed above apply with equal force to the analysis of two-dimensional images of other types and for different purposes. Many of these purposes lie within the field of criminology (DNA matching and ballistics analysis, for example), but, as was noted above, many other instances occur in industry, science and other fields of endeavor.

Accordingly, there exists a need for a method for conducting analysis of two-dimensional images, having variable color densities, proportional relationships or other characteristics which does not require measurements to be performed manually, and which therefore minimizes or eliminates the elements of inaccuracy and variability that are inherent in manual measurements. Furthermore, there exists a need for such a method that enables large numbers of measurements to be obtained, compiled and analyzed quickly and economically. Still farther, there exists a need for such a method that enables such measurements to be taken in a uniform manner, so that these can be compared with other samples or to predetermined standards in order to precisely and accurately identify internal consistencies. Still further, there exists a need for such a method, which will enable analysts to examine features of two-dimensional images that have not been visible or apparent when using conventional techniques. Still further, there exists a need for such a method which is easy and convenient to use, and which minimizes the physical and visual stress imposed on the operator in performing the analysis. Still farther, there exists a need for such a method which will permit measurements to be taken and used by a trained analyst who may be located remote from the site of the source image itself, so as to make this resource more readily available to persons and organizations in geographically remote areas.

SUMMARY OF THE INVENTION

The present invention has solved the problems cited above, and is a method for analysis of two-dimensional images having variable color densities, proportional relationships or other characteristics. Broadly, the method comprises the steps of: (a) measuring gray-scale densities at each of a plurality of locations having X-Y axis coordinates lying within the plane of the image; (b) calculating a value for each of the measured gray-scale densities so as to determine a z-axis coordinate for each of the locations; and (c) plotting the X-Y-Z axis coordinates for each of the locations so as to form a virtual 3-dimensional image having a contour that corresponds to variations in the gray-scale densities at the locations on the two-dimensional image.

The two-dimensional image may be a handwriting sample, or may be a two-dimensional image of a different type.

The step of measuring the gray-scale densities will comprise digitizing the two-dimensional image so as to form a digital bit map of the locations having the X-Y axis coordinates. The step of digitizing the two-dimensional image may comprise scanning the image so as to form the digital bit map.

The step of plotting the X-Y-Z axis coordinates for each of the locations may comprise forming the virtual three-dimensional image on a display monitor for visual analysis of the image by an operator. The step of forming the virtual three-dimensional image may comprise calculating the values for the measured gray-scale densities so as to provide Z-axis coordinates in a positive direction for each of the locations, so that the virtual three-dimensional image that is formed on the monitor appears as having raised contours. Alternatively, the values may be calculated so as to provide Z-axis coordinates in the negative direction for each of the locations, so that the virtual three-dimensional image appears as having depressed contours.

The method may further comprise the step of measuring at least one feature of the virtual three-dimensional image so as to analyze a characteristic of the two-dimensional image.

The step of measuring at least one feature of the virtual three-dimensional image may comprise measuring an apparent slope of the contours of the virtual three-dimensional image so as to analyze sharpness of an edge in the two-dimensional image.

The step of measuring at least one feature of the virtual three-dimensional image may comprise measuring apparent variations in elevation of the contours of the virtual three-dimensional image so as to analyze variations in color density in the two-dimensional image.

The step of measuring at least one feature of the virtual three-dimensional image may comprise measuring the apparent volume as defined by the contours of the three-dimensional image so as to analyze areas of relatively greater and lesser color density in the two-dimensional image. The step of measuring the apparent volume defined by the contours of the virtual three-dimensional image may comprise: selectively dividing the virtual three-dimensional image so as to define first and second portions of the image; measuring first and second apparent volumes defined by the contours of the first and second portions of the virtual three-dimensional image; and comparing the first and second apparent volumes so as to analyze distribution of the areas of greater and lesser color density in the two-dimensional image.

The two-dimensional image may be a stroke of writing in a handwriting sample, and the step of selectively dividing the virtual three-dimensional image may comprise: determining a maximum contour line extending generally lengthwise along the virtual three-dimensional image; dividing the virtual three-dimensional image along a plane extending from the maximum contour line in the direction of the Z-axis, so as to define the first and second portions of the image; measuring first and second volumes defined by the contours of the first and second portions of the virtual 3-dimensional image on opposite sides of the dividing plane; and comparing the first and second apparent volumes so as to analyze an angle in which a writing instrument was held as the stroke of writing was formed.

The present invention further provides a method for analysis of a handwriting sample, comprising the steps: (a) creating a digital representation of the handwriting sample; (b) marking at least first and second points on the digital representation which correspond to selected locations on the handwriting sample; and (c) comparing the first and second points on the digital representation so as to obtain a selective measurement of the handwriting sample.

The step of creating a visual representation of the handwriting sample may comprise forming a digital bit map of a plurality of locations having X-Y-axis coordinates lying within the plane of the handwriting sample. The step of marking of these first and second points on the digital representation may comprise marking at least first and second points on the digital bit map which correspond to selected locations on the handwriting sample.

The step of comparing the points marked on the bit map may comprise comparing the points so as to obtain a measurement of a slant angle of the handwriting sample.

The step of comparing the points on a bit map may comprise comparing the points so as to obtain a measurement of the height of the handwriting sample.

The step of marking the points on a bit map may comprise marking a plurality of points in a line which cuts across the selected stroke in the handwriting sample. The step of comparing the points so as to obtain a selected measurement may comprise measuring gray-scale density at the points in the line across the stroke; and translating the measured relative gray-scale density at the points so as to form a two-dimensional display for determining the angle of the writing instrument which formed the stroke.

The method may further comprise the steps of obtaining a plurality of the measurements for the handwriting sample, tabulating the plurality of measurements, and comparing the tabulated measurements with a predetermined standard so as to determine one or more characteristics relating to the person who produced the handwriting sample. The plurality of measurements may be compiled statistically to provide a unique identifier for the sample, and/or for the author or other originator of the sample.

The method may further comprise of the steps of measuring gray-scale densities at each of a plurality of locations having X-Y axis coordinates lying within the plane of the handwriting sample, calculating the value for each of the measured gray-scale densities so as to determine a Z-axis coordinate for each of the locations, and plotting the X-Y-Z axis coordinates for each of the locations so as to form a virtual three-dimensional image having a contour which corresponds to variations in the gray-scale densities at the locations on the handwriting sample.

These and other features and advantages of the present invention will be apparent from a reading of the following detailed description with reference to the accompanying drawings.

BRIEF DESCRIPTION OF THE DRAWINGS

Figure 9:
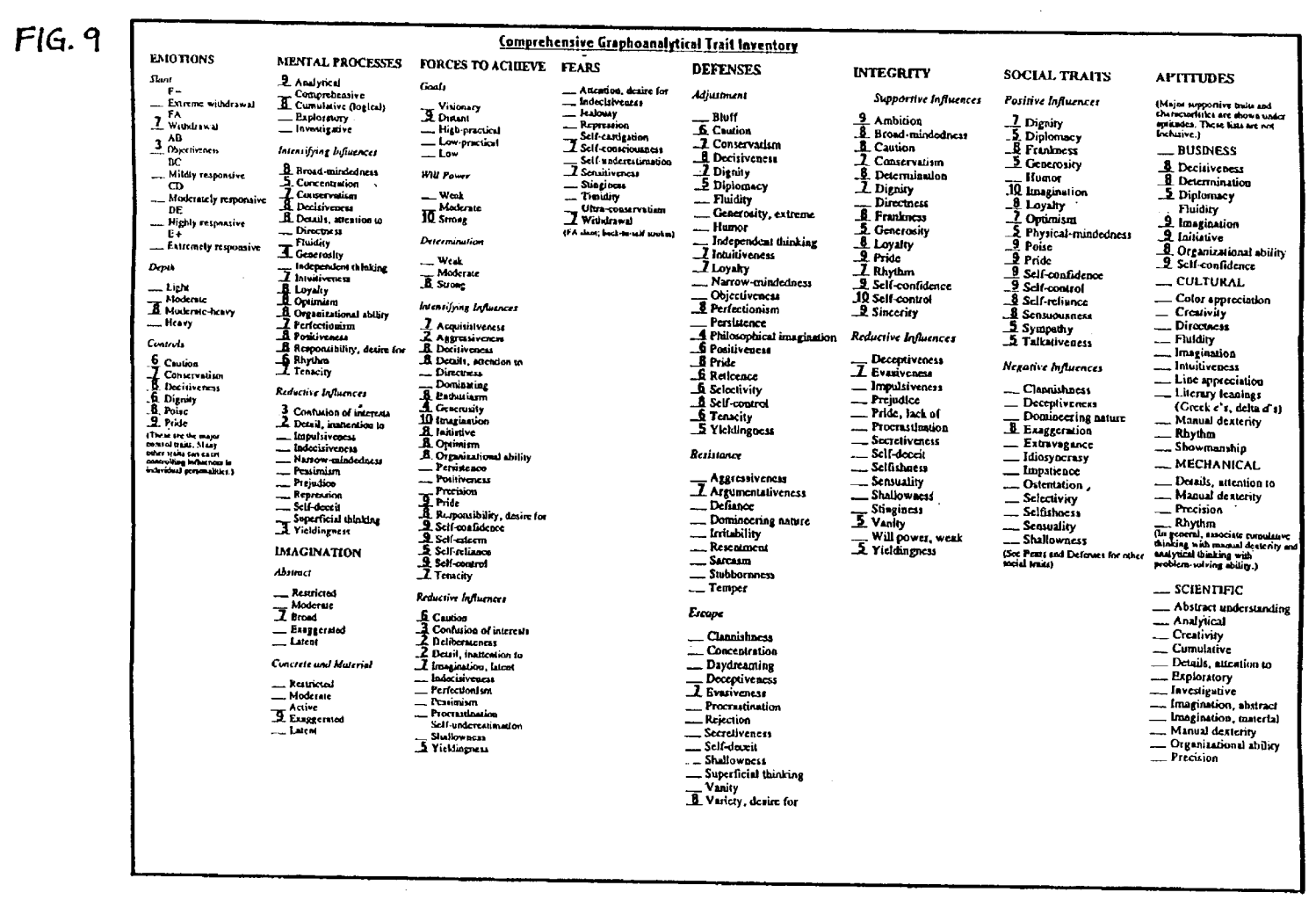

FIG. 9 is a portion of a comprehensive trait inventory produced for the writing specimen for FIG. 8 in accordance with the present invention; and FIG. 10 is a trait profile comparison produced in accordance with the present invention by summarizing trait inventories in FIG. 9.

DETAILED DESCRIPTION a. Overview

As was noted above, the present invention provides a method for analysis of two-dimensional images. The purposes of illustration, the invention will be described below primarily in the context of the analysis of sample of handwriting, although it will be understood that the two-dimensional images may be of any suitable type or origin.

One principal aspect of the present invention is to provide a virtual three-dimensional representation of the two-dimensional image, by measuring the differences in color/gray-scale density that exist within the two-dimensional image and then using these differences to calculate a value for the third axis of the three-dimensional image. The three-dimensional image that is created in this manner highlights the density patterns of the original two-dimensional image, and allows for precise measurement and evaluation of various aspects and features contained within the original image.

In a general sense, "color density" or "gray-scale density", as these terms are used herein, refers to the darkness of the image at any particular point. For example, in a typical handwriting stroke formed on white paper, the image will be lighter (i.e., have a lower color/gray-scale density) along its edge, will grow darker (i.e., have a greater color/gray-scale density) towards its middle, and will then taper off and become lighter towards its opposite edge. In other words, measured in a direction across the line, the color/gray-scale density is initially low, then increases, and then decreases again.

For ease of reference, the term "gray-scale density," as used in this description and the appended claims, will, unless specifically differentiated, be considered as including all forms of density existing in the two-dimensional image, whether "gray" in the sense of black-and-white or color in the sense of having a hue or hues.

Figure 2:
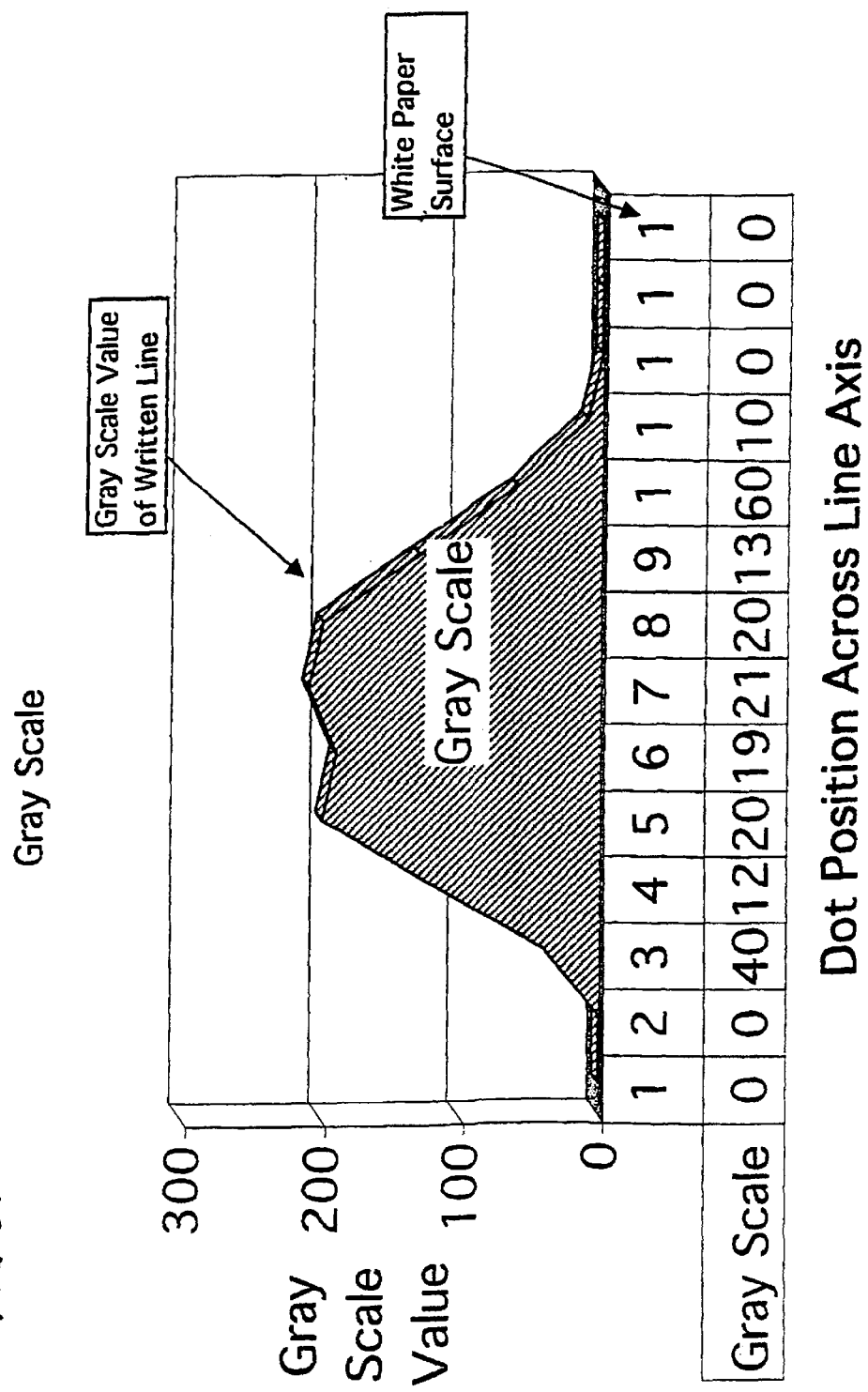
FIG. 2 is a graphical plot in which the vertical axis shows color density/gray-scaled density values that increase and decrease with increasing/decreasing darkness of the two-dimensional image, as measured along a line drawn across the image.

As is shown in FIG. 2, the increasing and decreasing color/gray-scale densities can be plotted on a vertical axis relative to dot locations along and across the two-dimensional image, i.e., along the X- and Y-axes that lie within the plane of the image. The color/gray-scale density can thus be used to calculate a value along a third axis (a "Z-axis") extending in the vertical direction, which when combined with the X- and Y-axes of positions in the two dimensional image forms a virtual three-dimensional (3-D) image that can be displayed on a computer monitor or other viewing device.

Figure 3:
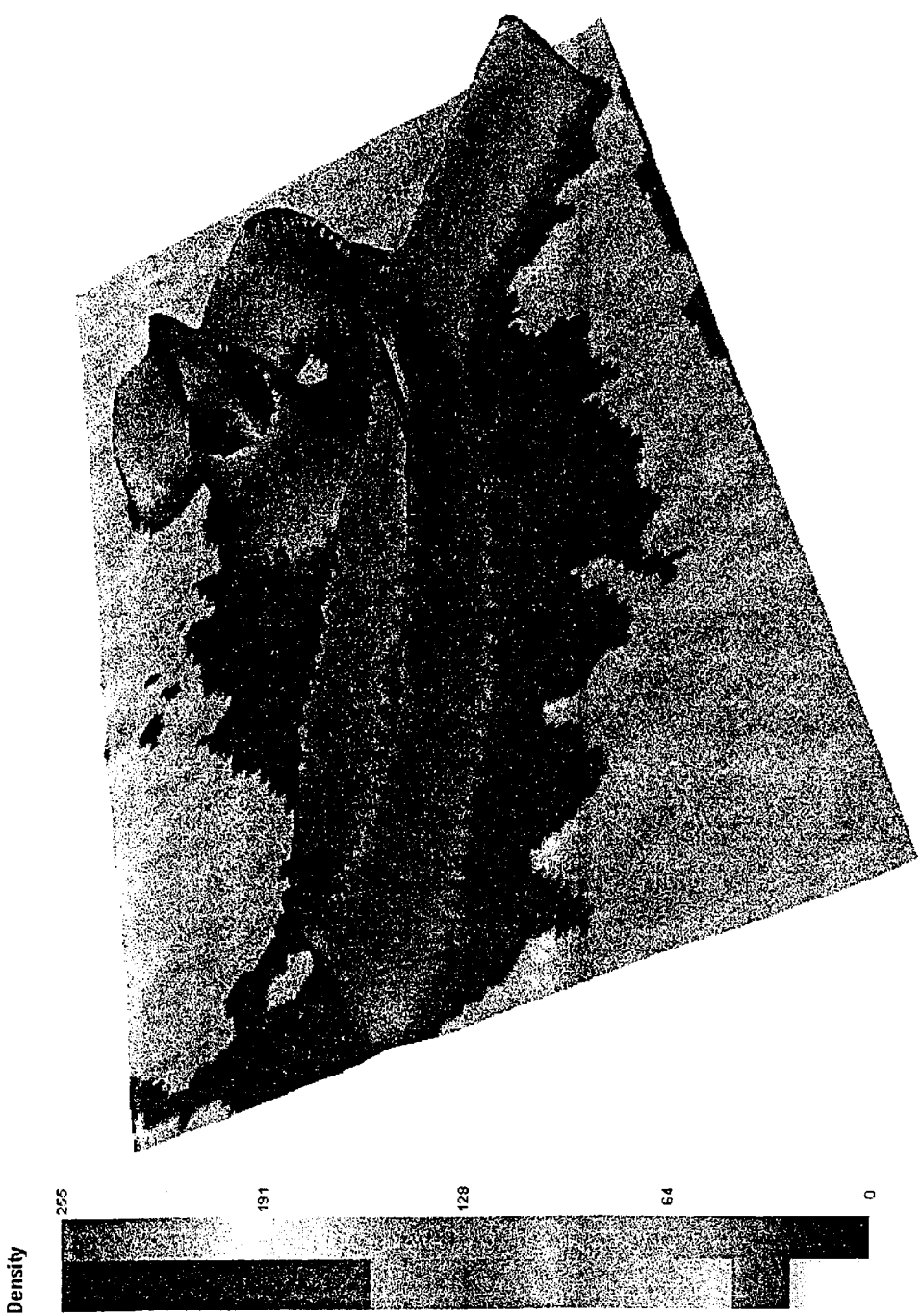
FIG. 3 is a virtual three-dimensional representation formed from a two-dimensional image, in this case a sample of handwriting, with areas of higher apparent elevation in the three-dimensional image corresponding to areas of increased gray-scale density in the original two-dimensional image.
Figure 4:
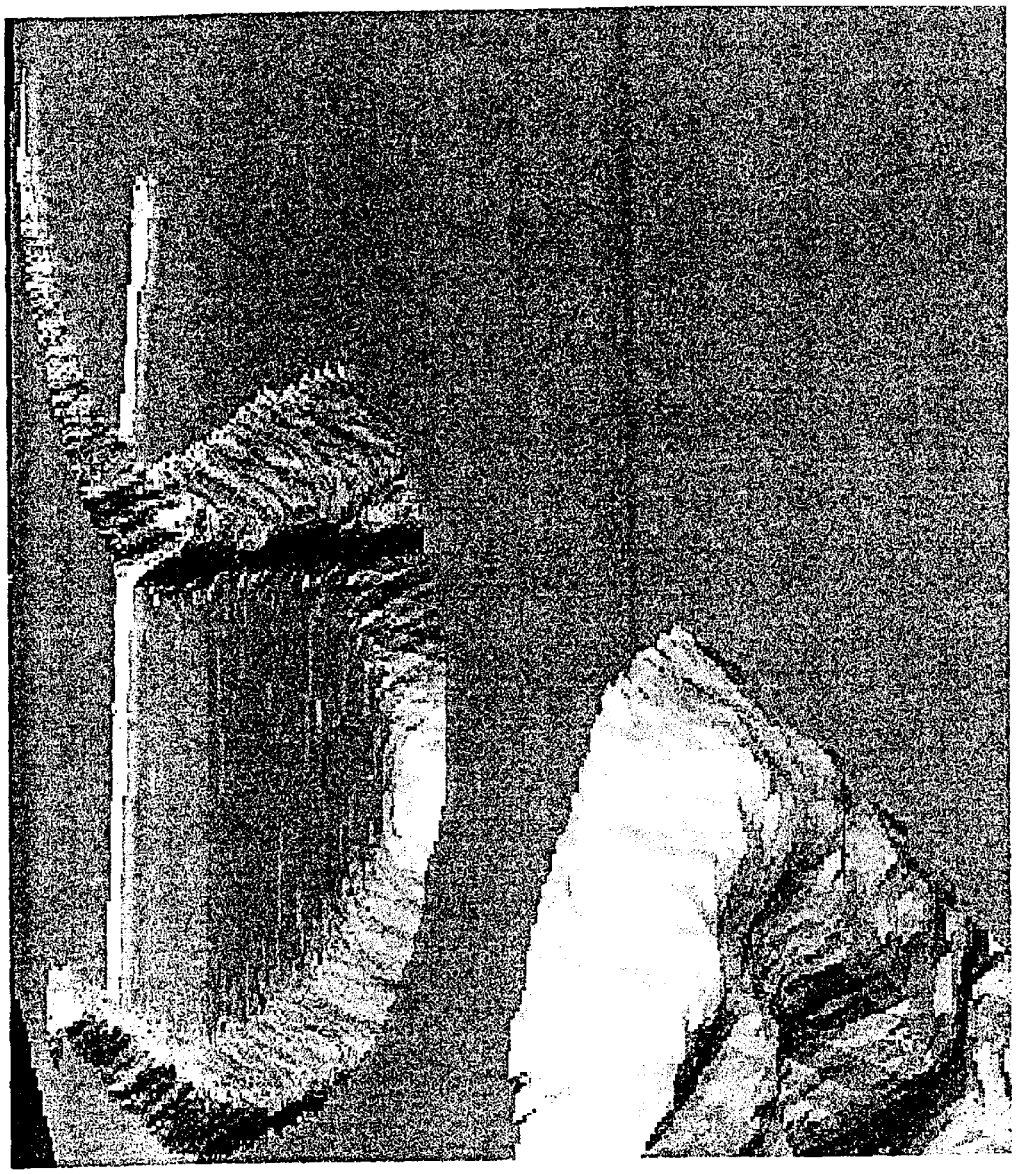
FIG. 4 is a virtual three-dimensional representation of a second two-dimensional image, with the two-dimensional image again being a sample of handwriting, but in this case with the value of the gray-scale density being inverted so as to be represented by the depth of a "channel" or "valley" rather than by the height of a raised "mountain range" as in FIG. 3.

As is shown in FIG. 3, the density measurements can be given positive values so that the Z-axis extends upwardly from the plane defined by the X- and Y-axes, producing a three-dimensional image that resembles a raised "mountain range"; alternatively, the Z-axis values may be in the negative direction, so that the image appears as a depressed channel or "canyon" as shown in FIG. 4. The image may be formed to include visible "contour lines" as shown, to aid in visualizing and measuring the image. Furthermore, as indicated by the scale on the left side of FIG. 3, the three-dimensional image may include shading or different colors at different heights to aid the operator in visualizing and analyzing the "highs" and "lows" of the image, somewhat analogous to the manner in which increasing elevations or depths may be indicated by designated colors on a topographical map. In addition, a shadow function may be included to further heighten the three-dimensional effect. It will be understood, however, that the representation is displayed as a "mountain range" or "canyon" to aid in visualization and measurement, and does not represent a physical gouge, trench or mound of ink upon the paper.

The three-dimensional presentation makes it possible for the operator to see and evaluate many more features and aspects of the two-dimensional source image than was previously possible. For example, by examining the "wings" and other features which develop where lines cross in the image, the operator may determine whether one line was written on top of the other or vice versa, e.g., to determine whether a signature was applied before or after a document was printed.

Figure 5:
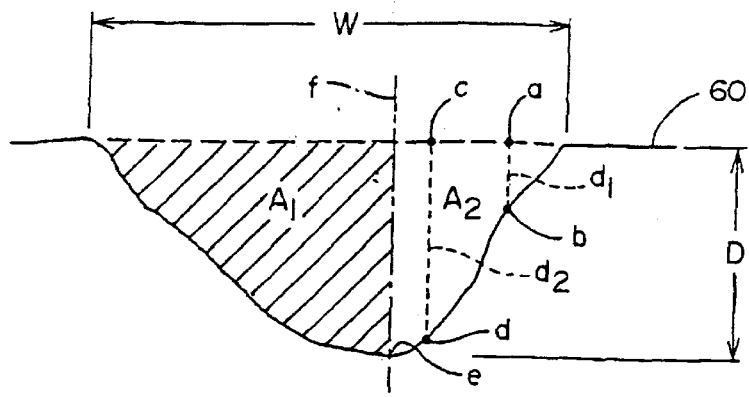
FIG. 5 is a cross-section taken transversely through the virtual 3-D image in FIG. 4, showing the contour of the "valley" which represents increasing and decreasing gray scale darkness/density as this is measured across a stroke of the writing sample.

As another example, the way in which the maximum "height" or "depth" of the three-dimensional image is shifted or "skewed" towards one side or the other can indicate the direction in which the pen or other writing tool was tilted as the stroke was made. As can be seen in FIG. 5, this particular measurement can be accomplished by determining the lowermost point or bottom "e" of the "valley", and then calculating the areas A1 and A2 on either side of a dividing line "f" which extends upwardly from the bottom of the valley, perpendicular to the plane of the paper surface; that side having the greater area (e.g., A1 in FIG. 5) represents that side of the stroke on which the pressure of the pen/pencil point was greater, and therefore indicates the angle of the instrument and which hand the writer used when forming the stroke. As a further step, the areas A1, A2 can be compiled and integrated over a continuous section of the writing. Furthermore, the line "f" can be considered as forming a divider plane or "wall" which separates the two sides of the valley, and the relative weights of the two sides can then be determined by calculating their respective volumes, in a manner somewhat analogous to filling the area on either side of "wall" with water. For the convenience of the user, the "water" can be represented graphically during this step by using a contrasting color (e.g., blue) to alternately fill each side of the "valley" in the 3-D display.

b. Digitizing Source Image

Figure 1:
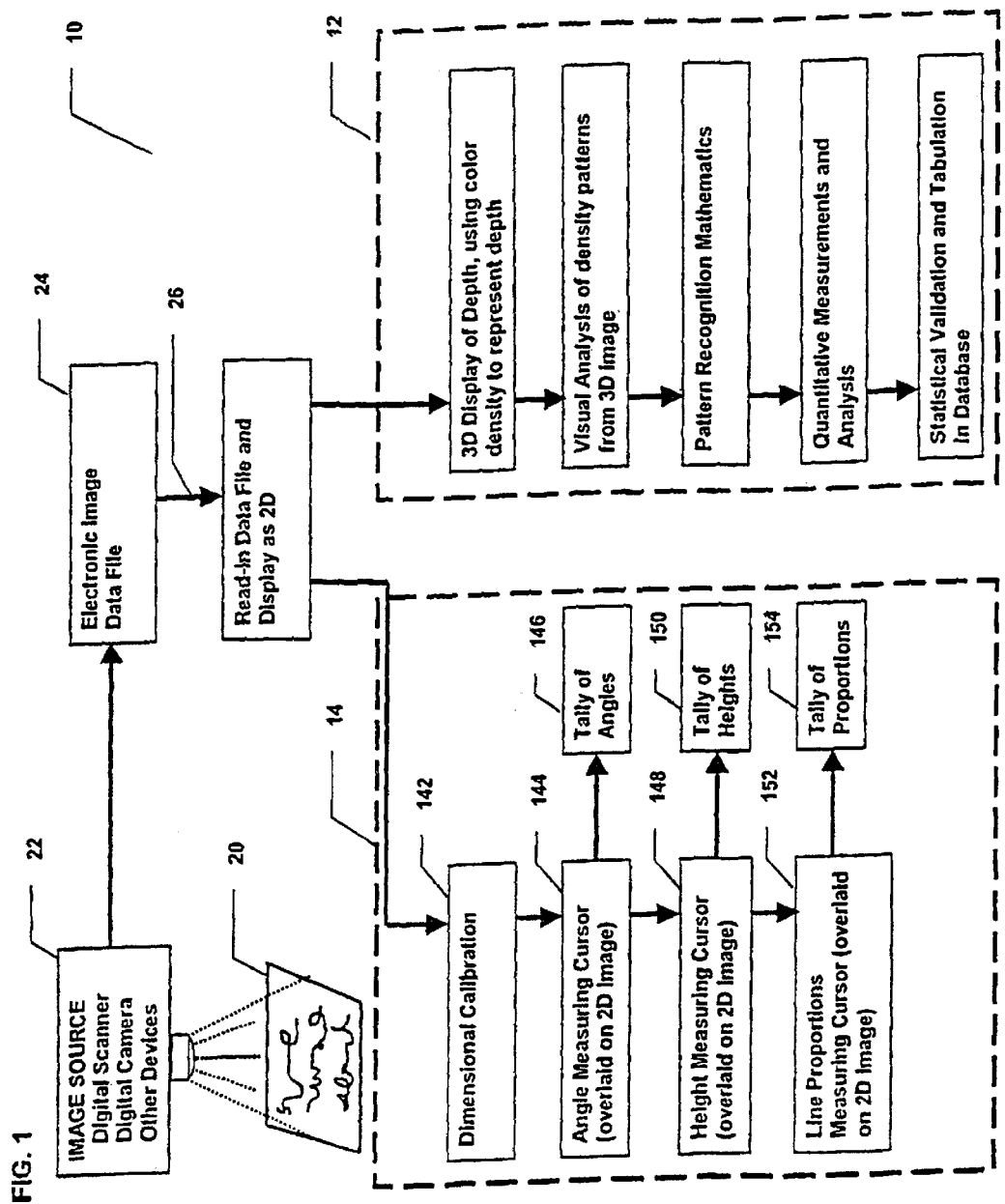
FIG. 1 is a block diagram showing the steps of obtaining a digital scan of the two-dimensional image to be analyzed, and then analyzing the relevant characteristics of the image in accordance with method of the present invention.

Diagram 10 in FIG. 1 illustrates the sequential steps in obtaining and manipulating the images in accordance with the present invention. As can be seen, the initial steps of scanning the two-dimensional image and reading the data file are followed by two, separate sequences, one for creating and analyzing the virtual 3-D image, and the other for creating and measuring/analyzing a digitized two-dimensional image that is derived from the same source.

Therefore, as can be seen, the first step in the process is to scan the handwriting sample 20 or other two-dimensional image, using, for example, a digital camera or scanner 22, so as to create a digital bit-map file 24. The digital bit-map file may be of any suitable type (e.g., .tif, .bmp, .pgm, .ppm or .mics) and, depending on the nature of the image source, various other forms of equipment may be employed for this purpose, such as MRI's and CT's (computer tomography) for medical applications, for example.

These first two steps can be performed using conventional scanning equipment, which is normally supplied by the manufacturer with suitable software for generating the bit-map file. For example, most digital image scanners may produce a bit map image by reporting a digital gray scale value of 0 to 255; the variation in shade or color density from say 100 to 101 on such a gray scale is not detectable by the human eye, so that the resulting images are extremely smooth in appearance, whether on-screen or printed. A 200 dpi resolution, in turn, is adequate to produce an image suitable for viewing on a high-resolution computer monitor, with the rated resolution for most consumer-level scanners being 600 dpi.

Thus, with "0" normally representing complete lack of color or contrast (white) and, for example, "255" representing complete absorption of incident light (black), the scanner reports a digital value of gray-scale density for each dot per inch at its rated resolution (e.g., 600 dpi). This produces a "bit map image", with each bit or pixel assigned a gray-scale value representing the darkness of the image at that point on the source document.

The bit-map file is next transmitted to the analysis platform, e.g., a suitable PC or other computer that has been loaded with software for carrying out the steps described below. Where the analysis platform is geographically remote from the source image/scanner, the bit-map file may be transmitted via a telephone modem or other data transmission link 26. The bit-map is read in at the analysis platform, as indicated at 28, and then processed to produce the virtual three-dimensional display and/or the digitized two-dimensional display, as will be described separately below.

It will be understood that it is well within the ability of a person having an ordinary level of skill in the art of computer programming to develop software for implementing these and the following method steps, using a PC or other suitable computer platform, given the descriptions and drawings which are provided herein.

c. Virtual Three-Dimensional Display/Analysis

To represent three-dimensional space, the method of the present invention uses an X-Y-Z coordinate system. In 2-D, the X and Y-axes lie in the horizontal plane. Point 0,0 represents the origin, where the Y- and Y-axes intersect. In 3-D, an additional Z-axis is used for points lying above and below the two-dimensional X-Y plane. The X-Y-Z axes intersect at the origin point, 0,0,0. Thus, as has been described above and as is shown in FIGS. 3 and 4, the third dimension adds the elements of elevation, depth, and rotation angle.

In a preferred embodiment, the positive direction of the X-axis goes to the right, the positive direction of the Y-axis goes up, and the positive Z-axis goes into the screen away from the viewer, as is shown in FIG. 3. This is referred to as a "left-hand" coordinate system. The "left-hand rule" may therefore be used to determine the positive axis directions: Positive rotations about an axis are in the direction of one's fingers if one grasps the positive part of an axis with the left hand, thumb pointing away from the origin.

Preferably, the X-Y-Z coordinate system is oriented to the screen, instead of "attached" to the 3-D view object. Thus, movement of the image simulates movement of camera: as the operator rotates an object, it appears as if the operator is "moving the camera" around the image. Moreover, distinctively colored origin markers may also be included along the bottom edge of an image to indicate the origin point (0,0,0) and the endpoint of the X-axis, respectively. These markers can be used to help re-orient the view to the X-Y plane—for example, after performing a series of zooms and/or rotations in 3-D space.

With regard to a sample of handwriting such as that described above, a typical pen stroke, when scanned at 600 dpi, will have multiple bits of gray scale data taken across the axis of the line; for instance, as is shown in FIG. 2, the gray scale values may be "0" for the white paper background, increasing to some value, say 200, perhaps holding near 200 for several "dots" and then decreasing to "0" again as the edge of the line transitions to background white paper value. To produce the virtual three-dimensional image, each of the gray-scale values is juxtaposed along the Z-axis with regard to the X-Y coordinates of the individual bits or locations in the two-dimensional image. Thus, juxtaposing the gray-scale values at the rated resolution of the scanner (e.g., 600 dpi) produces an on-screen display in which the original line is given raised contours and appears similar to a "mountain range". If the plotted data is given negative values instead of positive so as to produce contours in the negative direction, the image is inverted and appears as a "canyon" instead.

The resulting three-dimensional image, whether presented as a raised "mountain range" or a depressed "canyon," provides the operator with a means for viewing and measuring numerous, often subtle features and aspects that are contained within the original two-dimensional source. In some instances the virtual 3-D image makes certain aspects of the writing or other two-dimensional image easier to see and measure than has been possible in the past, while in other instances the 3-D image makes it possible to analyze certain features that could not be seen or measured at all when using prior techniques. Referring again to the example of handwriting, examples of particular visual and quantitative analyses that can be carried out using the 3-D image include those described below; in most of these examples reference is made to the positive-value "mountain range" image, however, it will be understood that the measurements and analysis can be similarly performed using the negative-value "canyon" image.

i. Angles of "Mountain Sides"

The apparent "steepness" of the mountain slopes is clearly visualized in the three-dimensional image, and expresses the sharpness of the edge of the line in the two-dimensional source; i.e., the steeper the slope, the sharper the edge of the line.

Quantitatively, the steepness of the slope relative to a baseline can be expressed in degrees of angle, rise/run, curve fit to an expression of the type y=mx+b, and in polar coordinates. Using the virtual three-dimensional image produced as described above, the expression of slope can be measured using the digital coordinates along the entire scanned line length to arrive at an average value, standard deviation from the mean, and the true angle within a confidence interval, plus many other possible correlations.

ii. Height/Depth of "Mountain Range"

The magnitude (i.e., the apparent height) of the contours in the virtual three-dimensional image is directly related to the gray-scale density of the line, e.g., a dark-black line results in a taller "mountain range" (or deeper "canyon") as compared to a lighter, hard-lead pencil line.

Quantitative measurements of the "mountain range" height can be made at selected points, regions, or over the entire length of the line. Statistical evaluation of the mean and standard deviation of the heights can be performed, for example, to mathematically establish whether certain lines are the same or statistically different.

iii. Variation in Height of "Mountain Range"

Variations in "mountain range" height in writing samples made using the same instrument may reveal changes in the pressure applied by the writer, stop/start points, mark-overs, and other artifacts.

Changes in height are common in the highly magnified 3-D display; quantification will show if the changes are statistically significant and not within the expected range of heights. Each identified area of interest can be statistically examined; for example, for similarities to other regions of interest, other document samples, and other authors.

iv. Width of "Mountain Range" at Base and Peak

Visual examples show variations in width at the base of the "mountain range", allowing comparison with similar regions of text.

Quantification of the width can be done for selected regions or for the entire line, with statistical mean and standard deviation values. Combining the width with the height measurement taken earlier may reveal unique ratios for individual writing instruments, papers, writing surfaces, pen pressure, and others factors.

v. "Skewness" of "Mountain Range," i.e., Leaning Left or Right

Visual examples display a unique angle for a single author, whether free-writing or tracing, while a second author shows a visibly different angle while tracing the first author's writing.

Quantitative measurement of the baseline center and the peak center points can provide an overall angle of skew. A line through the peak perpendicular to the base will divide the range into two sides of unequal contained area, an alternative measure of skew value.

vi. "Wings" or Ridges Appearing at Line Intersections

Visual examination of line-crossing shows "wings" or ridges extending down the "mountainside", following the track of the lighter-density line.

Quantitative measure of these "wings" can be done to reveal a density pattern in a high level of detail. The pattern may reveal density pattern effects resulting from the two lines crossing, for example, effects indicating which of two lines was drawn over the other. Statistical measures can be applied to identify significant patterns or changes in density.

vii. Sudden Changes in "Mountain Range" Elevation

Visual inspection of the three-dimensional image readily reveals pen lifts, retraces and other effects as revealed by sudden changes in "mountain range" elevation.

Quantitative measure of height can be used to note when a change in height is statistically significant, and to identify the measure of the change. Similar and dissimilar changes elsewhere in the document can be evaluated and compared.

viii. Fill Volume of "Mountain Range"

Qualitatively, a number of effects are noted as a result of such "filling," which may be more easily visualized in the "canyon" mode, such as a flat bottom "canyon" created by felt tip marker, "hot spots" of increased color density (deeper pits in the canyon), and other areas of the "canyon" in which it's contours change with fill (peninsulas, islands, etc.). The "filling" can be done by filling in the interior of the three-dimensional image to a predetermined z-axis level, using, for example, a contrasting color on the visual presentation.

Quantitatively, calculation of the volume, e.g., the amount of virtual "water" required to fill the canyon, can be performed. Relating the amount (for example, in "gallons") to fill one increment (for example, one "foot") over the entire depth of the "canyon" will reveal a plot of gallons per foot that will vary with canyon type. For instance, a square vertical wall canyon will require the same gallons per foot from bottom to top; a canyon with even 45° sloped walls will require two times as many gallons to fill each succeeding foot of elevation from bottom to top.

ix. Color Density or Gray-Scale Isopleths Connecting Similar Values of Gray-Scale Along the "Mountain Range" Sides or "Canyon" Walls Visually, this appears similar to a conventional topographic map. This is similar to the simulated water-fill described above, however it does not hide features as water level rises. Each isopleth on the topographical map is conceptually similar to a beach mark left along a lake or pond.

Quantitatively, a variety of isopleths measures can be taken to provide more information. For instance, the length of the isopleths, and various distances measured horizontally and vertically on the same or sequential isopleths.

x. Color Value (RGB, Hue and Saturation) of Individual Dots

Color, as reported by color capable scanners, can be a valuable addition to the magnified three-dimensional display of the original document.

Quantitatively identifying the color value can provide valuable information, especially in the area of line intersections. In certain instances it may be possible to identify patterns of change in coloration that reveal line sequence. Blending of colors, overprinting or obscuration, ink quality and identity, and other artifacts may be available from this information.

d. Manipulation/Refinement of Virtual 3-D Image

Manipulating and/or refining the image, in one or more ways, including those set forth below, may in some instances facilitate the measurement and analysis of the virtual three-dimensional image. The specific options described in the following sections may suitably be implemented using the Visualization ToolKit (VTK) package available from Kitware™ (www.kitware.com). It will be understood that these steps will generally be familiar to those skilled in the art of computer-generated 3-D graphics, and furthermore, that additional types and forms of manipulation/refinement will occur to such persons skilled in the relevant art.

i Smoothing/Unsmoothing

A technique known in the relevant art as "smoothing" can be used to soften or anti-alias the edges and lines within an image. This is useful for eliminating "noise" in the image.

ii. Applying Decimation (Mesh Reduction)

Decimation is a technique that can be used to speed computer processing of the image.

In 3-D image processing, an object or solid is divided into a series or mesh of geometric primitives (triangles, quadrilaterals, or other polygons) that form the underlying structure of the image. This structure can be seen most clearly when viewing an image in wire frame, zooming in to enlarge the details.

Decimation is the process of decreasing the number of polygons that comprise this mesh, therefore simplifying the wire frame image. Applying decimation is one way to help speed up and simplify processing and rendering of a particularly large image or one that strains system resources. For example, a 90%, 50%, or 25% decimation rate may be applied. In the process of decimation, the geometry of the image is retained within a small deviation from the original image shape, and the number of polygons used in the wire frame to draw the image is decreased. The higher the percentage of decimation applied, the larger the polygons are drawn and the fewer shades of gray (in gray-scale view) or of color (in color-scale view) are used.

The decimated image does not lose or destroy data, but recalculates the image data from adjacent pixels to reduce the number of polygons needed to visualize the magnified image. The original image shape is unchanged within a small deviation limit, but the reduced number of polygons speeds computer processing of the image. If the image shape cannot conform to the original image shape within a small deviation, then smaller polygons are retained and the goal of percentage decimation is not achieved. This may occur when a jagged, unsmoothed, image with extreme peaks and valleys is decimated.

When building 3-D forensic visualizations of evidentiary images, decimation can be used to advantage for initially examining images. Then, when preparing the actual analysis for presentation, the decimation percentage can be set back to undo the visualization effects of the decimation.

iii. Sub-Sampling

Sub-sampling reduces image data file size to optimize processing and rendering time, especially for a large image or an image that strains system resources. When the system displays a three-dimensional image in the manner described above, it samples every pixel of the corresponding scan in order to build the 3-D image. Sub-sampling is a digital image-processing technique of sub-sampling every second, or third, or fourth pixel, (depending on the amount of sub-sampling specified by the user) instead of sampling every pixel to display a 3-D image.

The resulting view is some simplification of the image. In addition to optimizing processing, the operator can use more extreme sub-sampling as a method for greatly simplifying the view to focus on features at a larger-granular level of the image.

When sub-sampling an image, fewer polygons are used to draw the image since there are fewer pixels defining the image. The more varied the topology of the image, the more likely that sub-sampling will not adequately render an accurate shape of the image. The lower the sub-sampling percentage, the fewer the number of pixels and the larger the polygons are drawn. Fewer shades of gray (in grayscale view) or of color (in color scale view) are used.

iv. Super-Sampling

Super-sampling can be used to refine the three-dimensional image.

Super-sampling is a digital image-processing technique of interpolating extra image points between pixels in displaying a 3-D image. When super-sampling an image, more image points and polygons are used to draw it. The higher the super-sampling percentage, the more image points are added and the smaller the polygons are drawn and the more shades of gray (in gray-scale view) or of color (in color-scale view) are used. The geometry of the super-sampled image is not altered as compared to the pixel-by-pixel sampling at 100%.

The resulting view is a greater refinement of the image. It should be borne in mind that super-sampling generally increases both image file size and processing and rendering time.

v. Horizontal Cross-Section Transformation

Horizontal cross-section transformation can be used to create a horizontal, cross-sectional slice (parallel to the X-Y plane) parallel to isopleths.

vi. Invert Transformation

Invert transformation can be used to invert the isopleths in the current view, transforming virtual "mountains" into virtual "canyons" and vice versa.

For instance, when a written specimen is first viewed in 3-D, the written line may appear as a series of canyons, with the writing surface itself at the highest elevation, as in this example. In many cases, it may be easier to analyze the written line as a series of elevations above the writing surface. Invert transformation can be used to adjust the view accordingly.

vii. Threshold Transformation

Threshold transformation allows the operator to set an upper and lower threshold for the image, filtering out values above and below certain levels of the elevation. The effect is one of filling up the "valley" with water to the lower contour level and "slicing" off the top of the "mountains" at that level. This allows the operator to view part of an isopleths or a section of isopleths more closely without being distracted by isopleths above or below those upper/lower thresholds.

f. Two-Dimensional Display/Analysis

In addition to the virtual three-dimensional analysis described above, the digitalization of the source images also permits enhanced two-dimensional analysis of the images, which, for example, can be of particular value with respect to certain types of handwriting analysis.

The steps in performing the two-dimensional are illustrated in block 14 in FIG. 1. Two principal measurements that can carried out in the two-dimensional analysis are (a) the slant angles of the strokes in the handwriting, and (b) the relative heights of the major areas of the handwriting. These angles and heights are illustrated in FIG. 6, which shows a handwriting sample 110 having a base line 112 from which the other measurements are taken; in the example shown in FIG. 1, the base line is drawn beneath the entire phrase for ease of illustration, but it will be understood that in most instances the base line will be determined separately for each stoke or letter in the sample.

Figure 6:
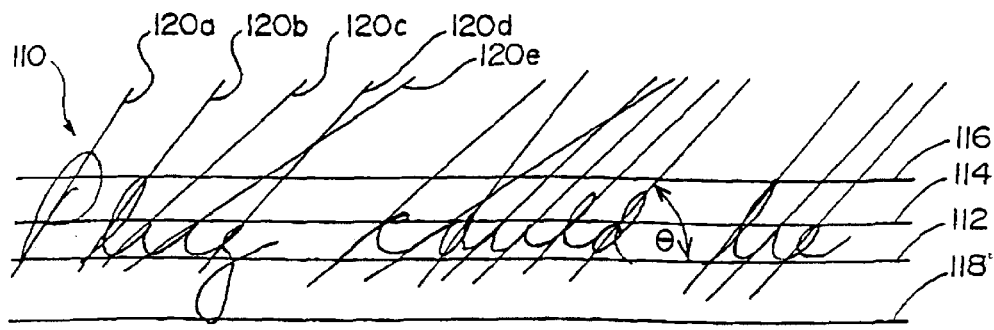
FIG. 6 is a reproduction of a sample of handwriting, marked with lines to show the major elements of the writing and the upstroke slants thereof, as these are measured and analyzed in accordance with another aspect of the present invention.

A first area above the base line, up to line 114 in FIG. 6, defines what is known as the mundane area, which extends from the base line to the upper limit of the lower case letters; for purposes of analyzing emotional responsiveness, the mundane area is considered to represent the area of thinking, habitual ideas, instincts and creature habits, and also the ability to accept new ideas and the desire to communicate them.

The extender letters continue above the mundane area, to an upper line 116 that defines the limit of what is termed the abstract area, which is generally considered to represent that aspect of the writer's personality that deals with philosophies, theories and spiritual elements.

Finally, the area between base line 112 and the lower limit line 118 defined by the descending letters (e.g., "g", "y", and so on) is termed the material area, which is considered to represent such qualities as determination, material imagination, and the desire for friends, change, and variety.

The base line also serves as the reference for measuring the slant angle of the strokes forming the various letters. As can be seen in FIG. 6, the slant is measured by determining a starting point where a stroke lifts off the base line (see each of the upstrokes) and an ending point where the stroke ceases to rise, and then drawing a line (120a, 120b, 120c, 120d . . . , in FIG. 6) between these points and determining the angle to the base line.

Figure 7:
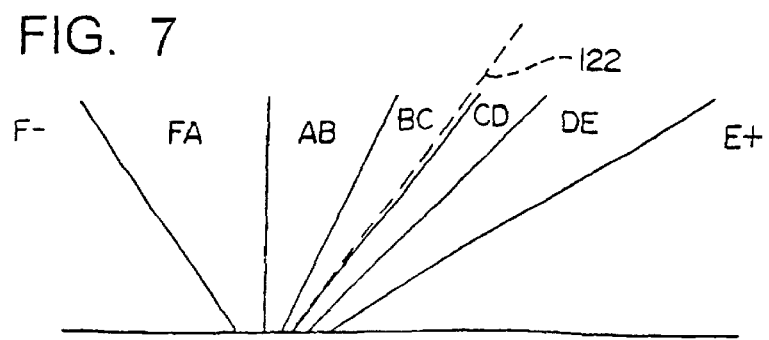
FIG. 7 is an angle scale having zones that designate a writer's emotional responsiveness based on the angle of upstrokes in a sample of handwriting, with the dotted line therein showing the average of the slant angles measured from the sample of FIG. 6.

The angles are summed and divided to determine the average slant angle for the sample. This average is then compared with a standard scale, or "gauge", to assess that aspect of the subject's personality, which is associated with the slant angle of his writing. For example, FIG. 7 shows one example of a "slant gauge", which in this case has been developed by the International Graphoanalysis Society (IGAS), Chicago, Ill. As can be seen, this is divided into seven areas or zones—"F–", "FA", "AB", "BC", "CD", "DE" and "E+"—with each of these corresponding to some aspect or quality of the writer's personality. The more extreme angles to the right of the gauge are considered indicative of increasing emotional responsiveness, whereas more upright slant angles are an indication of a less emotional, more self-possessed personality; for example, the slant which is indicated by dotted line 122 lies within the zone "BC", which is an indication that the writer, while tending to respond somewhat emotionally to influences, still tends to be mostly stable and level-headed in his personality.

As is shown in FIG. 1, the initial step in the two-dimensional analysis is to read in the digital bit-map file, which has been transmitted from the scanner system in the manner that has been previously described, and to display this on the computer monitor. As a preliminary to conducting the measurements, the operator performs a dimensional calibration of the system (block 142): This can be done by placing a scale (e.g., a ruler) or drawing a line of known length (e.g., 1 centimeter, 1 inch, etc.) on the sample, then marking the ends of the line using a cursor and calibrating the display to the known distance; alternatively, the subject may be asked to produce the handwriting sample on a form having a pre-printed calibration mark, which has the advantage of achieving a high degree of accuracy.

Figure 8:
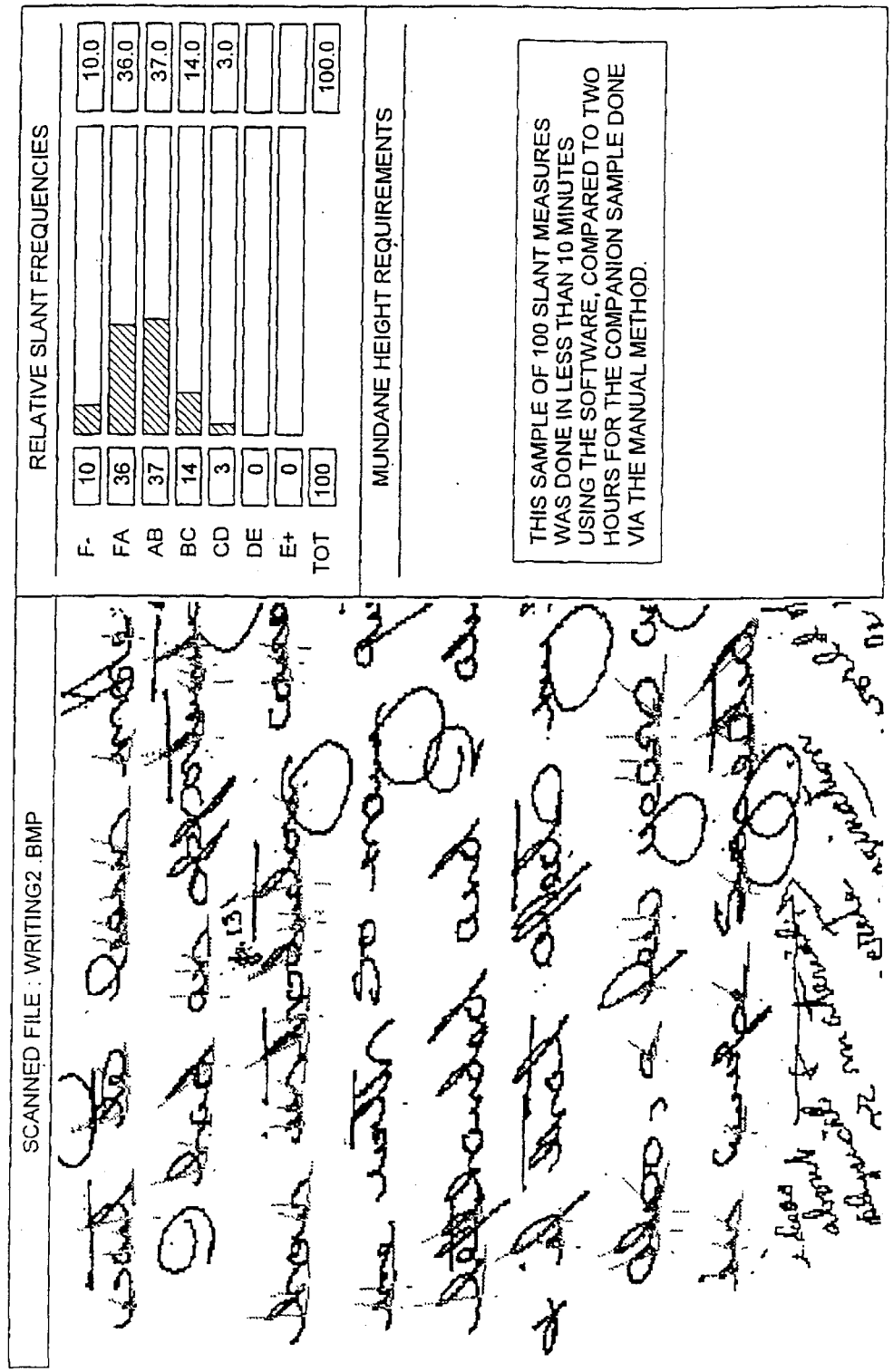
FIG. 8 is a reproduction of a digitized sample of handwriting, as this is displayed on a computer monitor in accordance with another aspect of the present invention, showing exemplary cursor markings on which measurements are based, and also showing a summary of the relative slant frequencies which are categorized by the sections of the slant gauge of FIG. 7.

After dimensional calibration, the user takes the desired measurements from the sample, using a cursor displayed on the monitor as shown in FIG. 8. To mark each measurement point, the operator moves the cursor across the image that is created from the bit-map, and uses the curser to mark selected points on the various parts of the strokes or letters in the specimen.

To obtain the angle measurement (block 144 in FIG. 1), the operator first establishes a base line to serve as a reference. Since the letters themselves may be written at an angle across the page, the base line is preferably established for each individual stroke or letter, rather than assuming a common base line for an entire line or page. Establishing the base line begins by pinning the point where each stroke begins to rise from its lowest point.

The operator then positions the cursor to mark the bottom of the adjacent down stroke (i.e., the point where the down stroke stops descending) or the beginning of the next upstroke, and, the angle between the two markers establishes the base line for that stroke or letter.

To measure the slant angle, the operator next uses the moving cursor to mark the top of the stroke, identifying the end of the stroke, i.e., the point at which the writer began his/her "lift-off" in preparation for making the next stroke, can be done visually by the operator, while in other embodiments this determination may be performed by the system itself by determining the point where the density of the stroke begins to taper off. In those embodiments that rely on visual identification of the end of the stroke, the size of the image may be enlarged (magnified) on the monitor to make this step easier for the operator.

Once the top of the stroke has been marked, the slant angle of the stroke is determined by calculating the included angle between the base line and the line from the first marker to the marker on the upper end of the stroke. The angle calculation is performed using standard geometric equations.

As each slant angle is calculated, it is added to the tally of strokes falling in each of the categories (block 146 in FIG. 1), e.g., the seven categories of the "slant gage" shown in FIG. 7. For example, if the calculated slant angle of a particular stroke is 60°, then this is added to the tally of strokes falling in the "BC" category. Then, as the measurement of the sample progresses, the number of strokes in each category and their relative frequencies is tabulated for assessment by the operator; for example, in FIG. 8, the number of strokes out of 100 falling into each of the categories F–, FA, AB, BC, CD, DE and E+ are 10, 36, 37, 14, 3, 0 and 0, respectively. The relative frequencies of the slant angles (which are principally an indicator of the writer's emotional responsiveness) are combined with other measured indicators to construct a profile of the individual's personality traits, as will be described in greater detail below.

As is shown at block 148 in FIG. 1, the next major step in the two-dimensional analysis of handwriting is to obtain the height measurements of the various areas of the writing, e.g., the relative heights of the mundane area, abstract area, and material area. Although for purposes of discussion this measurement is described as being carried out subsequent to the slant angle measurement step, the system is preferably configured so that both measurements are carried out simultaneously, thus greatly enhancing the speed and efficiency of the process.

Accordingly, as the operator uses the curser to mark the top of each stroke, the height of the stroke is calculated from the vertical distance between the marker at the top of the stroke and the base line.

As with the slant angle measurements, the height measurements are tallied (block 150 in FIG. 1) for use by the graphoanalyst. For example, the heights can be tallied in categories according to their absolute dimensions (e.g., a separate category for each 1/16 inch), or by the proportional relationship between the heights of the different areas. In particular, the ratio between the height of the mundane area and the top of the ascenders (e.g., 2×the height, 2"×, 3×, and so on) is an indicator of interest to the graphoanalyst.

The depth measurement phase of the process, as indicated at block 152 in FIG. 1, differs from the steps described above, in that what is being measured is not a geometric or dimensional aspect of each stroke (e.g., the height or slant angle), but is instead a measure of its intensity, i.e., how hard the writer was pressing against the paper when making that stroke. This factor in turn is used to "weight" the character trait which is associated with the stroke; for example, if a particular stroke indicates a degree of hostility on the part of the writer, then a darker, deeper stroke is an indicator of a more intense degree of hostility.

While graphoanalysts have long tried to guess at the pressure which was used to make a stroke so as to use this as a measure of intensity, in the past this has always been done on an "eyeball" basis, resulting in extreme inconsistency of results. The present invention eliminates such inaccuracies: In making the depth measurement, a cursor is used which is similar to that described above, but in this case is manipulated to define a "slice" running across some part of the pen or pencil line which forms the stroke. Then, in a manner similar to forming the virtual three-dimensional image described above, the system measures the gray-scale density of each pixel along the track across the stroke, and compiles a list of the measurements as the darkness increases generally towards the center of the stroke and then lightens towards the opposite edge. The darkness (absolute or relative) of the pixels and/or the width/length of the darkest portion of the stroke are then compared with a predetermined standard (which preferably takes into account the type of pen/pencil and paper used in the sample), or with darkness measurements taken at other areas or strokes within the sample itself, to provide a quantifiable measure of the intensity of the stroke in question; for example, a calibration can be performed by measuring the density of a sample of rich black, which will be taken as having absolute darkness, and then comparing this measurement to the density measurements obtained from the sample.

As is shown in FIG. 5, the levels of darkness measured along each cut may be translated to form a two-dimensional representation of the "depth" of the stroke. In this figure (and in the corresponding monitor display), the horizontal axis represents the linear distance across the cut, while the vertical axis represents the darkness that is measured at each point along the horizontal axis, relative to a base line 160 that represents the color of the paper, Accordingly, the two-dimensional representation forms a valley "v" which extends over the width "w" of the stroke. For example, for a first pixel measurement "a" which is taken relatively near the edge of the stroke, where the pen/pencil line is somewhat lighter, the corresponding point "d" on the valley curve is a comparatively short distance "d1" below the base line, whereas for a second pixel measurement "c" which taken nearer to the center of the stroke where the line is much darker, the corresponding point "d" is a relatively greater distance "d2" below the base line, and so on across the entire width "w" of the stroke. The maximum depth "D" along the curve "v" therefore represents the point of maximum darkness/intensity along the slice through the stroke.

As can be seen at block 154 in FIG. 1, the depth measurements are tallied in a manner similar to the angle and height measurements described above, for use by the graphoanalyst by comparison with predetermined standards.

Thus, referring to blocks 146, 150, and 154 in FIG. 1, the system assembles a complete tally of the angles, heights, and "depths" that have been measured from the sample. As was noted above, the graphoanalyst can compare these results with a set of predetermined standards so as to prepare a graphoanalytical trait inventory, such as that which is shown in FIG. 5, this being within the ability of a graphoanalyst having an ordinary level of skill in the relevant art.

The trait inventory can in turn be summarized in the form of the trait profile for the individual (see FIG. 10), which can then overlaid on or otherwise displayed in comparison with a standardized or idealized trait profile. For example, the bar graph 158 in FIG. 10 compares the trait profile which has been determined for the subject individual against an idealized trait profile a "business consultant", the latter having been established by analyzing samples of handwriting produced by persons who have been successful in this particular occupation.

It is to be recognized that various alterations, modifications, and/or additions may be introduced into the constructions and arrangements of parts described above without departing from the spirit or ambit of the present invention.

What is claimed:

1. A method for analysis of a two-dimensional image, said method comprising the steps of:

measuring gray-scale densities at each of a plurality of locations having X-Y axis coordinates lying within a plane of said image;

calculating a value for each of said measured gray-scale densities so as to determine a Z-axis coordinate for each of said locations; and plotting said X-Y-Z axis coordinates for each of said locations so as to form a virtual three-dimensional image having a contour which corresponds to variations in said gray-scale densities at said locations in said two-dimensional image.

2. The method of claim 1, wherein the step of measuring gray-scale densities comprises:
digitizing said two-dimensional image so as to form a digital bit-map of said locations having said X-V axis coordinates.

3. The method of claim 2, wherein the step of digitizing said two-dimensional image comprises:
scanning said two-dimensional image with a digital scanner so as to form said digital bit-map.

4. The method of claim 3, wherein the step of plotting said X-Y-Z axis coordinates for each of said locations comprises:
of forming said virtual three-dimensional image on a display monitor for visual analysis of said image by an operator.

5. The method of claim 4, wherein the step of forming said virtual three-dimensional image comprises: calculating said values for said measured grey-scale densities so as to provide a Z-axis coordinate in a positive direction for each of said locations, so that said virtual three-dimensional image that is formed on said monitor appears as having raised contours.

6. The method of claim 4, wherein the step of forming said virtual three-dimensional image comprises:
calculating said values for said measured gray-scale densities so as to provide a Z-axis coordinate in a negative direction for each of said locations, so that said virtual three-dimensional image that is formed on said monitor appears as having depressed contours.

7. The method of claim 1, further comprising the step of measuring at least one feature of said virtual three-dimensional image so as to analyze a characteristic of said two-dimensional image.

8. The method of claim 7, wherein the step of measuring at least one feature of said virtual three-dimensional image comprises:
measuring an apparent slope of said contours of said virtual three-dimensional image so as to analyze sharpness of an edge in said two-dimensional image.

9. The method of claim 7, wherein the step of measuring at least one feature of said virtual three-dimensional image comprises:
measuring apparent variations in elevation of said contours of said virtual three-dimensional image so as to analyze variations in density in said two-dimensional image.

10. The method of claim 7, wherein the step of measuring at least one feature of said virtual three-dimensional image comprises: measuring an apparent volume defined by said contours of said virtual three-dimensional image so as to analyze areas of relatively greater and lesser density in said two-dimensional image.

11. The method of claim 10, wherein the step of measuring an apparent volume defined by said contours of said virtual three-dimensional image comprises:
selectively dividing said virtual three-dimensional image so as to define first and second portions of said image;
measuring first and second apparent volumes defined by said contours of said first and second portions of said virtual three-dimensional image; and
comparing said first and second apparent volumes so as to analyze distribution of said areas of greater and lesser density in said two-dimensional image.

12. The method of claim 11, wherein said two-dimensional image is a stroke of handwriting in a sample, and wherein the step of selectively dividing said virtual three-dimensional image comprises:
determining a maximum contour line extending generally lengthwise along said virtual three-dimensional image;
dividing said virtual three-dimensional image along a plane
extending from said maximum contour line in the direction of said Z-axis, so as to define first and second portions of said image;
measuring first and second volumes defined by said contours of said first and second portions of said virtual three-dimensional image on opposite sides of said dividing plane; and
comparing said first and second apparent volumes so as to analyze an angle at which a writing instrument was held as said stroke of writing was formed.

13. A method for analysis of a handwriting sample, comprising the steps of:
creating a digital representation of said handwriting sample; marking at least first and second points on said digital representation which correspond to selected locations on said handwriting sample; and
comparing said at least first and second points on said digital representation so as to obtain a selected measurement of said handwriting sample;
wherein the step of creating a digital representation of said handwriting sample comprises:
forming a digital bit map of a plurality of locations having X-Y axis coordinates lying within the plane of said handwriting sample;
wherein the step of marking at least first and second points on said digital representation comprises:
marking at least first and second points on said digital bit map which correspond to selected locations on said handwriting sample; and wherein the method
further comprises the steps of: Measuring gray-scale densities at each of a plurality of said
locations having X-Y axis coordinates lying within a plane of said handwriting sample;
calculating a value for each of said measured gray-scale densities so as to determine a Z-axis coordinate for each of said locations; and plotting said X-Y-Z axis coordinates for each of said locations so as to form a virtual three-dimensional image having a contour which corresponds to variations in said gray-scale densities at said locations in said handwriting sample.

14. The method of claim 13, wherein the step of plotting said X-Y-Z axis coordinates for each of said locations comprises:
forming said virtual three-dimensional image on a display monitor for visual analysis of said image by an operator.

15. The method of claim 14, wherein the step of forming said virtual three-dimensional image comprises:
calculating said values for said measured gray-scale densities so as to provide a Z-axis coordinate in a positive direction for each of said locations, so that said virtual three-dimensional image that is formed on said monitor appears as having raised contours.

16. The method of claim 14, wherein the step of forming said virtual three-dimensional image comprises:
calculating said values for said measured gray-scale densities so as to provide a Z-axis coordinate in a negative direction for each of said locations, so that said virtual three-dimensional image that is formed on said monitor appears as having depressed contours.

17. The method of claim 13, further comprising the step of:

measuring at least one feature of said virtual three-dimensional image so as to analyze a characteristic of said handwriting sample.

18. The method of claim 17, wherein the step of measuring at least one 30 feature of said virtual three-dimensional image comprises:

measuring an apparent slope of said contours of said virtual three-dimensional image so as to analyze sharpness of an edge of a stroke in said handwriting sample.

19. The method of claim 17, wherein the step of measuring at least one feature of said virtual three-dimensional image comprises:

measuring apparent variations in elevation of said contours of said virtual three-dimensional image so as to analyze variations in color density in said handwriting sample.

20. The method of claim 17, wherein the step of measuring at least one feature of said virtual three-dimensional image comprises:

measuring an apparent volume defined by said contours of said virtual three-dimensional image so as to analyze areas of relatively greater and lesser density in said handwriting sample.

21. The method of claim 20, wherein the step of measuring an apparent volume defined by said contours of said virtual three-dimensional image comprises:

selectively dividing said virtual dimensional image so as to define first and second portions of said image;

measuring first and second apparent volumes defined by said contours of said first and second portions of said virtual three-dimensional image; and comparing said first and second apparent volumes so as to analyze distribution of said areas of greater and lesser density in said handwriting sample.

22. The method of claim 21, wherein the step of selectively dividing said virtual three-dimensional image comprises:

determining a maximum contour line extending generally lengthwise along said virtual three-dimensional image;

dividing said virtual three-dimensional image along a plane extending from said maximum contour line in the direction of said Z-axis, so as to define first and second portions of said image; measuring first and second volumes defined by said contours of said first and second portions of said virtual three-dimensional image on opposite sides of said dividing plane; and comparing said first and second apparent volumes so as to analyze an angle at which a writing instrument was held as said sample of handwriting was formed.

* * * * *

UNITED STATES PATENT AND TRADEMARK OFFICE
CERTIFICATE OF CORRECTION

PATENT NO. : 6,757,424 B2
DATED : June 29, 2004
INVENTOR(S) : Patrick B. Love

It is certified that error appears in the above-identified patent and that said Letters Patent is hereby corrected as shown below:

<u>Column 17,</u>
Line 4, "X-V" should be -- X-Y --
Line 17, "grey-scale" should be -- gray-scale --

Signed and Sealed this

Twenty-first Day of September, 2004

JON W. DUDAS
*Director of the United States Patent and Trademark Office*